United States Patent [19]

Whiteley

[11] 4,059,777
[45] Nov. 22, 1977

[54] COOLING OF DISCOIDAL DYNAMOELECTRIC MACHINES

[75] Inventor: Eric Whiteley, Peterborough, Canada

[73] Assignee: Canadian General Electric Company Limited, Toronto, Canada

[21] Appl. No.: 613,565

[22] Filed: Sept. 15, 1975

[30] Foreign Application Priority Data

Sept. 30, 1974 Canada .................................. 210350

[51] Int. Cl.² ........................................... H02K 5/18
[52] U.S. Cl. ...................................... 310/64; 310/268; 165/86
[58] Field of Search ................. 310/268, 54, 52, 53, 310/55, 57, 58, 59, 60, 61, 62, 63, 64, 65; 165/86, 107

[56] References Cited

U.S. PATENT DOCUMENTS

| 3,277,323 | 10/1966 | Parker | 310/268 |
| 3,296,475 | 1/1967 | Parker | 310/60 |
| 3,428,840 | 2/1969 | Kober | 310/55 |
| 3,445,691 | 5/1969 | Beyersdorf | 310/60 |
| 3,469,134 | 9/1923 | Beyersdorf | 310/268 |
| 3,838,301 | 9/1974 | Moriyama | 310/63 |
| 3,979,619 | 9/1976 | Whiteley | 310/268 |

Primary Examiner—R. Skudy
Attorney, Agent, or Firm—R. A. Eckersley

[57] ABSTRACT

An axial gap, disc type, dynamoelectric machine has a stator housing, field pole structures located inside the housing at angularly spaced intervals, and a discoidal rotor. The field pole structures alternate with interpolar spaces. Fluid directing means are provided for inducing vortical fluid flow enhances heat transfer from the rotor to the housing.

22 Claims, 17 Drawing Figures

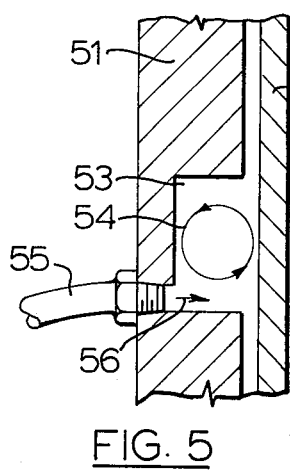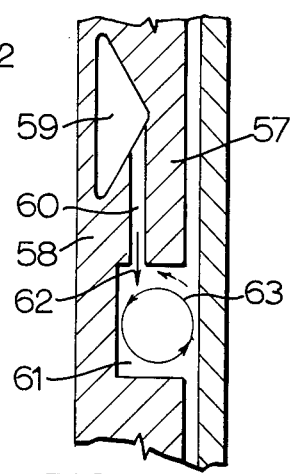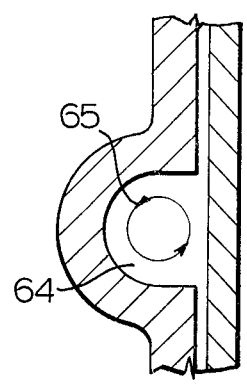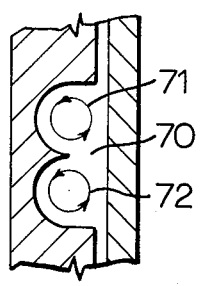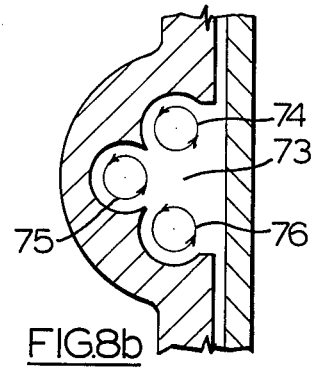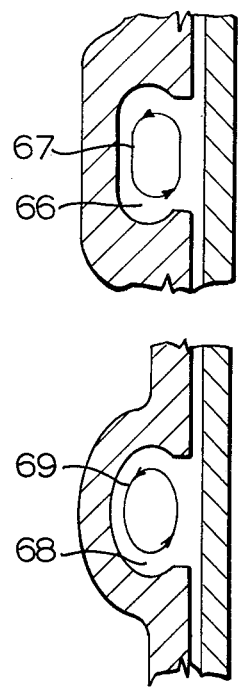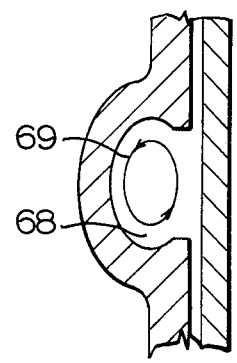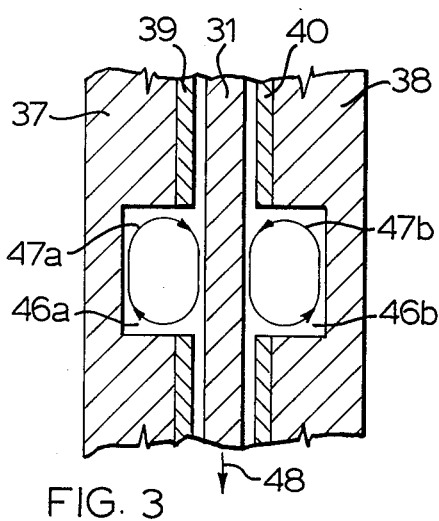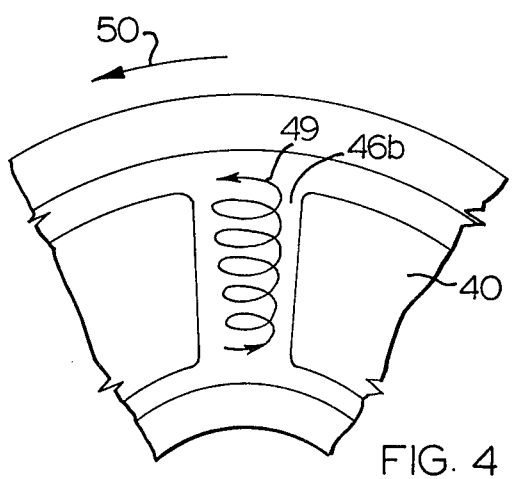

COOLING OF DISCOIDAL DYNAMOELECTRIC MACHINES

This invention relates to means for improving the cooling of axial gap, disc-type dynamoelectric machines, and in particular to means for inducing vortical flow of the cooling fluid in the interpolar spaces.

Dynamoelectric machines of the general character suitable for embodiment of this invention are of the axial gap, disc-type such as, for example, the machine described in the applicant's United States application Ser. No. 534,058 filed Dec. 26, 1974, Eric Whiteley. This particular machine has a stator housing, a plurality of field pole structures located inside the housing at angularly spaced intervals so as to define an interpolar space between every adjacent pair of pole structures, and a rotor consisting essentially of a winding laid out in a flat pattern and having its conductors bonded together by means of a resinous material. The resin bonded winding is a unitary structure in the configuration of an annular disc located between an inner and an outer ring. The disc is a flat and relative thin member which contains the sides of the coils and is located between the pole faces of the pole structures spaced axially therefrom; the rings are usually somewhat thicker because they contain the coil end-heads and connections.

The object of the invention is to improve the cooling of this type of machine through the flow of the cooling fluid in the machine.

An axial gap, disc-type, dynamoelectric machine has a stator housing, a plurality of field pole structures located inside the housing at angularly spaced intervals so as to define interpolar spaces, and a discoidal rotor supported for rotation in axialy spaced relation to the pole faces of the pole structures. According to the invention fluid directing means are provided for inducing vortical flow of the cooling fluid in the interpolar spaces. Vortical fluid flow enhances the transfer of heat from the rotor to the housing.

A number of embodiments of the invention will now be described in more details with reference to the accompanying drawings, in which:

FIG. 3 is a partial section of adjacent pole structures and the space between them as seen from A—A of FIG. 1;

FIG. 4 is a partial section of adjacent pole structures and the space between them as seen from B—B of FIG. 1;

FIGS. 5 to 10 are views like that of FIG. 3 showing different configurations of the vortex inducing interpolar spaces. These Figures show only one of the two stator or housing members.

Figures 1, 2:
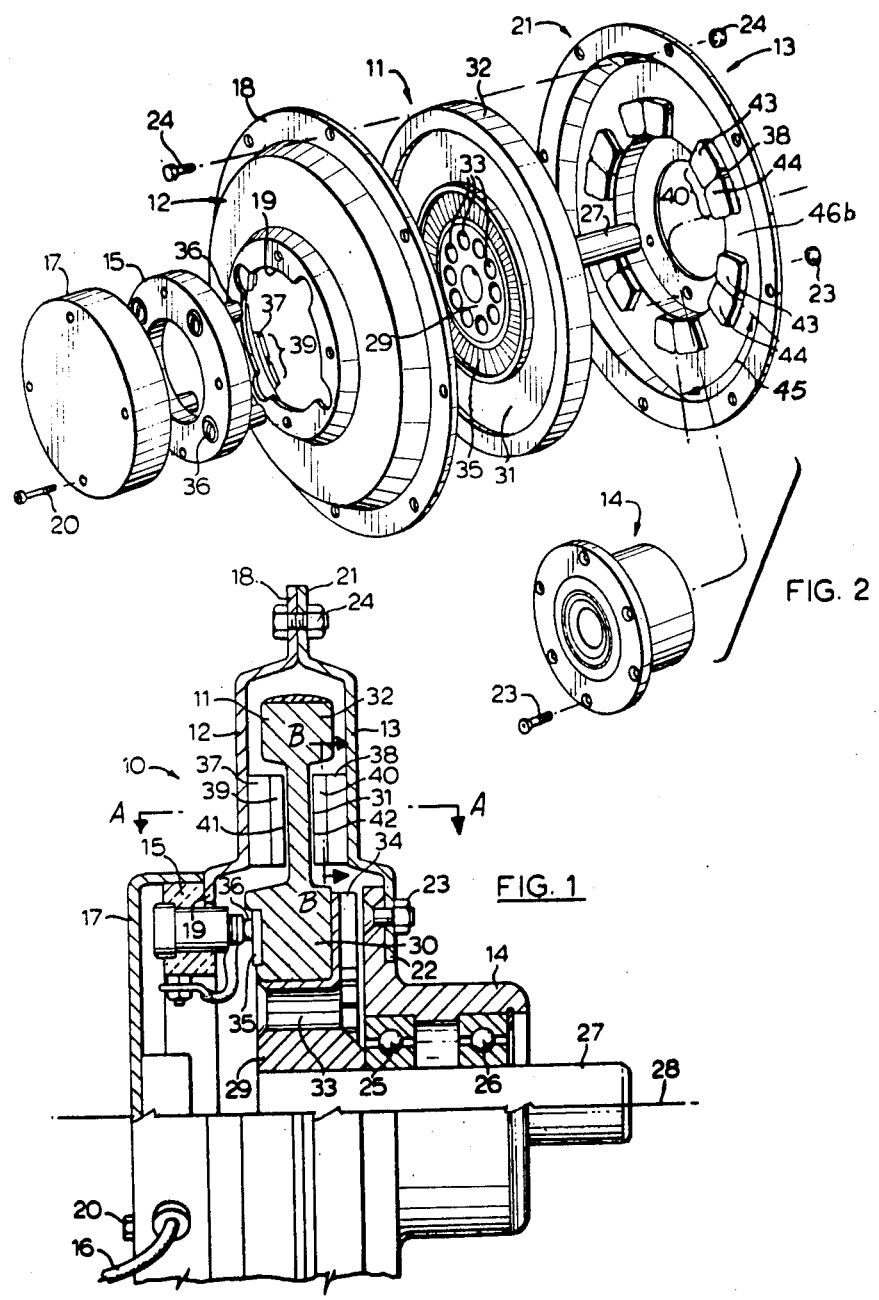
FIG. 1 is a view in elevation and partial section of an axial gap, disc-type, dynamoelectric machine.
FIG. 2 is an exploded view in perspective of the machine shown in FIG. 1.

In FIGS. 1 and 2 there is shown a dynamoelectric machine 10 of a type adaptable to the invention. This machine is illustrated as a DC machine, and it may be used either as a motor or a generator. However, for purposes of the description to follow the machine will be referred to hereinafter as a motor. Machine 10 consists essentially of a rotor 11 supported for rotation in a stator having housing members 12 and 13, rotor supporting structure 14, brush gear 15, leads 16 and a cover 17 for the brush gear.

Housing members 12 and 13 are dish-shaped members made of a magnetic material such as mild steel and serve as the yoke of the magnetic field circuit and provide a substantial portion of the enclosure for the machine. Member 12 has an outer edge portion 18, an open centre defined by the inner edge portion 19, and has the brush gear 15 and cover 17 therefor secured to this inner edge portion by means of a number of bolts 20. Member 13 has an outer edge 21, an open centre defined by the inner edge portion 22, and has the bearing retaining member 14 secured to this inner edge portion by means of a number of bolts 23. Members 12 and 13 are secured together at their outer edge portions 18 and 21 by means of a number of bolts 24. The rotor supporting structure includes member 14 and the ball bearings 25 and 26 which are mounted inside the member and carry the shaft 27 of rotor 11. The bearings support the rotor for rotation on its axis 28. Leads 16 provide a circuit for connecting the brushes on gear 15 to a power source.

Rotor 11 resembles a disc wheel. It consists of the following annular portions disposed concentrically about axis 28; a shaft 27; a hub 29 secured to shaft 27; an inner ring portion 30 secured to the hub; a disc portion 31 integral with the inner ring portion; and an outer ring portion 32 integral with the disc portion. Disc portion 31 and ring portions 30 and 32 consists of a plurality of coils nested together in an annular array and bonded together by means of a resinous material, e.g., an epoxy resin, to provide a strong and rigid discoidal rotor structure wherein the electrical conductors of the coils reinforce the resinous mass mechanically. The hub 29 serves as a means for supporting the discoidal structure on the shaft for rotations in a plane normal to axis 28 and may also act as an impeller for circulating a cooling fluid counter-clockwise around the discoidal structure. If the hub is to be used as a fluid impeller; it can be formed with a number of axial fluid flow passages 33 and a number of radially disposed blades 34. In the machine illustrated, rotor 11 is the armature, and it has a commutator consisting of an annular array of segments 35 connected to the various coil ends and bonded to the inner ring portion 30 by means of the resin that bonds the coils together. Brush gear 15 carries a number of conductive brushes 36 which bear against the commutator and thereby connect the armature winding to leads 16.

FIG. 1 shows one pair of complementary poles, i.e. one pair of the six pairs of poles provided in the machine shown in FIG. 2. Each pair of poles consists of magnetic spacing members 37 and 38 attached to housing members 12 and 13 respectively and permanent magnets 39 and 40 attached to members 37 and 38 respectively, components 37 and 39 being regarded as one pole structure and components 38 and 40 as the other pole structure of the pair. Each pole structure 37, 39 projects from housing member 12 and terminates in a pole face 41 on the magnet, and each pole structure 38, 40 projects from housing member 13 and terminates in a pole face 42 on the magnet. Pole faces 41 and 42 are located directly opposite each other on opposite sides of the rotor disc portion with small gaps left between the rotor disc portion and the pole faces. These gaps allow the rotor freedom of rotation between the various pairs of poles. Spacers 37 and 38 may be pieces of a mild steel welded to the housing members and the magnets may be bonded to them by means of an epoxy or a methyl-2-cyanoacrylate (Eastman 910) adhesive. In the interest of manufacturing economy, magnets 39 and 40 will usually be flat on both sides and of uniform thickness and the spacers will be shaped to position the magnets for the required pole face spacing and a attitude.

Although in FIG. 1, pole faces 41 and 42 are shown in parallel planes normal to the axis of rotation of the rotor, they need not necessarily be so; the pole faces may lie in planes that are other than normal to axis 28 as shown in U.S. application Ser. No. 534,009, filed Dec. 18, 1974 Eric Whiteley. Pole faces 41, 42 are of opposite magnetic polarity so that the permanent magnets 39, 40 aid in providing magnetic flux in the gap between their faces, i.e., the gap containing the rotor disc. Since spacers 37, 38 and housing members 12, 13 are made of magnetic materials they provide return flux paths.

In very small machines, magnets 39, 40 will probably be single permanent magnet units. However, in the larger machines, each one of the magnets 39 and 40 may be a mosaic of unit permanent magnets of the nature described and claimed in the applicant's U.S. application Ser. No. 502,007 filed Aug. 30, 1974, Eric Whiteley. In FIG. 2 each permanent magnet 40 is shown as a mosaic of two unit magnets 43, 44. Magnets 39 are also mosaics of two units each.

Windings suitable for use in rotor 11 are disclosed in U.S. applications Ser. No. 534,058 filed Dec. 26, 1974 and 534,009, filed Dec. 18, 1974, Eric Whiteley. This type of winding structure consists essentially of a plurality of multiple turn coils laid in a flat circular array with the coil sides overlapping in the winding disc portion 31 and the outer end inner end-heads nested together in the inner and outer ring portions 30, 32 respectively. The coils are identical, or as nearly identical as it is possible to make them, and they fit well together in a compact winding. The entire winding is encapsulated in a resinous material, e.g., an epoxy resin that will flow between the conductors. This produces a discoidal winding structure of electrical conductors bonded together by means of a resinous material, and a structure also bonded to hub 29. It is rigid and strong enough to be self supporting under operating conditions.

FIGS. 1 and 2 illustrate a totally enclosed machine in which the rotor is the main heat producing component. As a result, the heat produced in the rotor must be transferred to the enclosure by way of the cooling fluid in the machine and from there to the ambient. During rotation of rotor 11, impeller blades 34 impel the cooling fluid radially outward along the right hand surface of the rotor, axially around its periphery, radially inward along its left hand surface, and finally back to the blades by way of the flow passages 33 in hub 29. In its flow, the fuid comes into contact with both the rotor and the housing, and in so doing it transfers heat from the rotor to the housing, from which it is dissipated to the ambient. The cooling fluid may be a gas of relatively high specific heat or air.

It will be noted from FIG. 2 that the pole structures 38, 40 are located at spaced angular intervals 45 in housing member 13 so as to define interpolar spaces 46b between them. There is one space 46b for every pole structure. There is a like arrangement of spaced pole structures 37, 39 and interpolar spaces 46a in housing member 12. Impeller 34 gives the fluid in the machine a rotational component of flow as well as a radial component. Drag of the fluid on the rotor surface tends to add to the rotational component. Since the general path of fluid flow is interrupted by the pole structures, the fluid is given a helical direction of flow as well in the interpolar spaces, i.e., a radially directed flow pattern in each space 46 resembling a vortex. The overall effect of this vortical flow is to increase fluid flow over the surfaces of both the rotor and the housing, and in so doing, it enhances heat transfer from the rotor to the housing.

FIGS. 3 and 4 are partial section views of adjacent pole structures 37, 39 and 38, 40 and their interpolar spaces 46a, 46b respectively as seen from A—A and B—B of FIG. 1. Looking radially into the interpolar spaces as in FIG. 3, the vortices are illustrated by the loops 47a, 47b and their direction of rotation by the arrow heads on the loops for the rotor rotation 48. FIG. 4 is a view looking axially into space 46b where the vortex is represented by the helical configuration 49 for rotor rotation 50. It will be appreciated that the fluid flow in an interpolar space will not necessarily follow the simple vortical pattern illustrated, but will take the form of a main vortex accompanied by subsidiary vortices or eddies. These vortices increase fluid flow over the rotor and housing surfaces, enabling the fluid to transfer heat more effectively from the rotor to the housing.

The vortical fluid circulation described so far may be considered as "self-induced" in that it is caused by rotor rotation only, and it will be referred to hereinafter as the "self-induced" or "primary" vortex. Self-induced vortical flow is, of course, most effective at high rotor speeds. In those cases where rotor speeds are too low for optimum cooling, vortical flow may be increased by supplementing the internal flow with fluid flow from an external source as illustrated in FIG. 5. This figure shows a small portion of one of the two stator members 51 (i.e., housing members), a portion of rotor 52, an interpolar space 53 and the primary vortex 54 in space 53. Fluid from an external source may be introduced into each one of the interpolar spaces in the machine via suitable flow passages such as the conduit shown at 55 leading into space 53. This fluid enters space 53 tangentially with respect to vortex 54 as indicated by arrow 56 and at a velocity which, preferably, is greater than the velocity of vortical rotation. The stream of fluid 56 combines with vortex 54 to increase the amount of fluid in the vortex as well as the velocity thereof. This, then, provides for better heat transfer from rotor 52 to stator 51. This externally induced vortex effect will be referred to hereinafter as the "secondary" vortex. The final or resultant vortex is a combination of the primary and secondary effects. It is also possible to induce vortex 54 by means of stream 56 alone, that is, without assistance from rotor rotation.

FIG. 6 illustrates another way that fluid flow from an external source may be applied to induce a vortex 63 or combined with the fluid of the primary vortex. In this figure, each pole structure 57 of the stator member 58 is formed with a cavity 59 and a passage 60 leading from the cavity into an adjacent interpolar space 61. In this embodiment, fluid maintained under pressure in the cavity flows through the passage as a stream 62 into the interpolar space 61 to form vortex 63 or to combine with the primary vortex already there. As in the case of FIG. 5, this stream enters the interpolar space tangentially so as to induce vortical flow or intensify the vortex already there.

The main advantage of the combined vortical method of cooling is that a small quantity of an external fluid injected into the interpolar spaces at relatively high velocity causes a much larger mass of fluid to circulate vortically. In very low speed machines, there may be little or no tendency for vortical circulation, in which case the externally injected fluid will boost sluggish vortices or generate new ones.

It will be noted from FIGS. 3, 5 and 6 that more or less circular vortices are contained in generally rectangular spaces. In other words, the vortices are rounded fluid flow patterns contained in non conforming spaces. This does not lead to optimum vortex inducement or contact of the fluid with the stator surfaces. Vortex inducement can be enhanced by shaping the interpolar spaces for definite vortical fluid flow patterns. This shaping is desirable for both primary and secondary vortex flow.

FIG. 7 illustrates three different shapes that the interpolar spaces can take to improve vortical flow of the cooling fluid inside the machine. In the case of FIG. 7(a), the interpolar spaces 64 are made approximately semi circular from a radial point of view so as to guide the swirling fluid into a circular vortex. In FIG. 7(b) the interpolar spaces 66 are made rectangular with rounded ends so as to produce vortices 67 of flattened oval shape. In FIG. 7(c) the interpolar spaces 68 are made semielliptical so as to produce elliptical vortices 69. It is to be noted that each one of the three vortices shown in FIG. 7 is in effect a single main vortex which will probably include some subsidiary swirling of the fluid. Although but three shapes have been illustrated in FIG. 7, others will occur to those skilled in the art; the shape selected will depend upon the vortex wanted.

FIG. 8 illustrates two ways that the interpolar spaces can be shaped to produce multiple main vortices. In FIG. 8(a) the interpolar shape 70 is shown with a shape that produces two circular vortices 71 and 72, and in FIG. 8(b) the interpolar space 73 is shown with a shape that produces three circular vortices 74, 75 and 76. As in the case of FIG. 7(a), the interpolar spaces of FIG. 8 can be shaped to produce vortices other than cicular.

Figure 9:
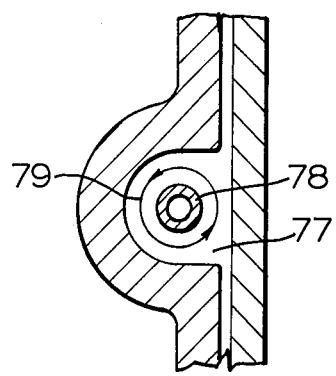

FIG. 9 is a modified version of the vortex inducing form shown in FIG. 7(a). In this figure, the interpolar space 77 is round and contains a round core member 78 around which the single main vortex 79 rotates. This particular arrangement is preferred for the larger machines where the interpolar spaces are large. A single vortical fluid flow pattern should be annular to be stable and reliable. The core member introduces an inner vortex forming surface which cooperates with the wall of space 77 to guide the fluid into an annular flow pattern. This core can be either hollow as shown or solid, and used to remove heat from the fluid. If hollow, a cooling fluid can be circulated through it, or if solid, it can be linked conductively with the stator member.

Figure 10:
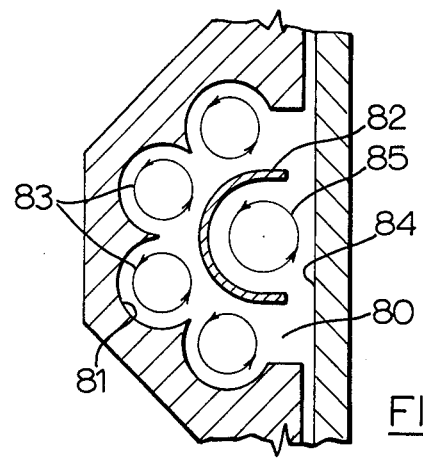

In the case of very large interpolar spaces, more effective cooling may be possible with a multiple of annular vortices of the nature illustrated in FIG. 10. In FIG. 10, the generally round outline of the interpolar space 80 contains a plurality of semi circular recesses 81 and a semi annular core member 82. Member 82 cooperates with recesses 81 in inducing vortices 83 and with the rotor surface 84 in inducing vortex 85. This leads to a high level of vortex activity, a level very effective in transferring heat from the rotor to the stator.

Figure 11:
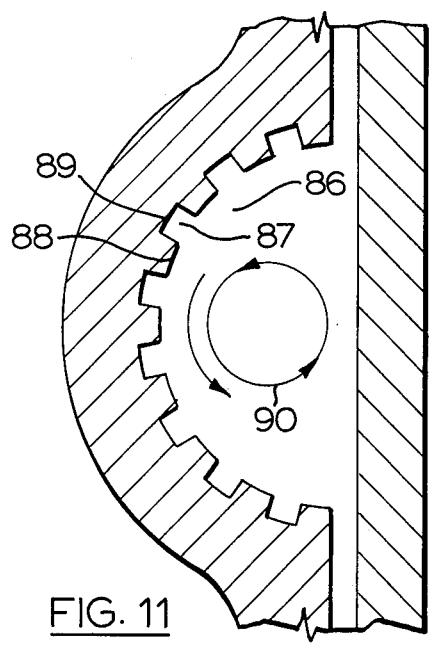
FIGS. 11 and 12 are views illustrating irregularities on vortex inducing surfaces.
Figure 12A:
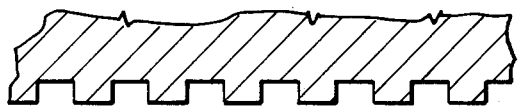
Figure 12B:
Figure 12C:
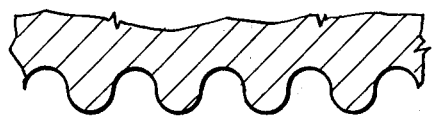

To increase heat transfer between the fluid which is moving in a vortical pattern in the interpolar spaces, the inner surfaces of the vortex inducing cavities may be irregular, i.e., provided with ribs, bosses, pins, grooves, etc. FIG. 11 shows an interpolar space 86 having its vortex inducing surface 87 formed with ribs 88 and grooves 89, the ribs and grooves running along the radial length of the interpolar space. The run of the ribs and grooves may be continuous or broken, and they may present a variety of profiles, three of which are illustrated in FIG. 12. In the design of a machine, the vortex inducing formations and their irregularities will be selected for optimum heat transfer and fluid efficiency of the vortices 90.

In the discussion of vortical fluid flow in connection with FIGS. 1 and 2, it was pointed out that rotation of impeller 34 and fluid drag on the rotating rotor surfaces tended to cause vortices in the interpolar spaces. Where a machine has extensive surface areas on the rotor exposed to the fluid, the drag of the fluid on these surfaces will, under certain circumstances, be adequate to maintain the vortices in the interpolar spaces, particularly when the spaces are shaped for vortex inducement such as illustrated in FIGS. 7 to 10. If an impeller such as 34 is not used, the fluid will have little or no radial component of movement; it will be a rotating mass of fluid in each interpolar spaces. This results in an effective means for transferring heat from the rotor to the housing and minimizes losses due to fluid movement.

What I claim as new and desire to secure by Letters Patent of the United States is:

1. An axial gap, disc-type dynamoelectric machine comprising a housing having a pair of oppositely disposed side walls and other wall means defining an enclosure for a cooling fluid; a discoidal rotor located inside said housing spaced from said walls with the axis of the discoid transverse to and in the middle of said side walls; means for supporting said rotor for rotation on said axis; a first field pole structure located inside said housing between one wall thereof and said rotor and having a first plurality of axially oriented pole bodies equally spaced from said axis and spaced apart so as to define radially directed interpolar spaces, said first pole bodies having planar pole faces located very near one planar surfaces of said rotor; a second field pole structure located inside said housing between the other wall thereof and said rotor and having a second plurality of pole bodies oriented axially with said first pole bodies and spaced apart so as to define other radially directed interpolar spaces, said second pole bodies having planar pole faces located very near the other planar surface of said rotor, and fluid directing means for inducing vortical flow of said cooling fluid in said interpolar spaces whereby the fluid transfers heat from the rotor to the housing.

2. The machine defined in claim 1 wherein said means for inducing vortical fluid flow comprises fluid impelling means on said rotor which imparts rotational components of flow to the fluid and said interpolar spaces direct these components into vortical flow patterns in the interpolar spaces.

3. The machine defined in claim 2 wherein said interpolar spaces have vortex inducing curvatures of which the centers of curvature lie on radially directed axes.

4. The machine defined in claim 2 wherein said fluid impelling means comprises an impeller on said rotor which imparts radial and rotational components of flow to the fluid.

5. The machine defined in claim 2 wherein said fluid impelling means comprises surfaces on said rotor at the interpolar spaces and of sufficient area for fluid drag thereon to induce vortical fluid flow in the interpolar spaces.

6. The machine defined in claim 3 wherein said curvatures have surfaces which are irregular.

7. The machine defined in claim 3 wherein each interpolar space contains an elongated core member disposed radially in the middle of the vortex.

8. The machine defined in claim 1 wherein said means for inducing vortical fluid flow in an interpolar space comprises means for directing at least one stream of said fluid tangentially into the interpolar space.

9. The machine defined in claim 3 wherein said means for inducing vortical fluid flow in an interpolar space includes means for directing at least one stream of said fluid tangentially into the interpolar space.

10. The machine defined in claim 3 wherein said curvatures are semi-circular.

11. The machine defined in claim 3 wherein said curvatures are semi-elliptical.

12. An axial gap, disc-type dynamoelectric machine comprising a housing suitable for containing a cooling fluid; a plurality of field pole structures located inside said housing in a circular array at angularly spaced intervals so as to define interpolar spaces; a discoidal rotor located inside said housing and supported for rotation in axially spaced relation with respect to the pole faces of said pole structures; and fluid directing means for inducing vortical flow of said cooling fluid in said interpolar spaces, whereby the fluid transfers heat from the rotor to the housing.

13. The machine defined in claim 12 wherein said means for inducing vortical fluid flow comprises fluid impelling means on said rotor which imparts rotational components of flow to the fluid and said interpolar spaces direct these components into vortical flow patterns in the interpolar spaces.

14. The machine defined in claim 13 wherein said fluid impelling means comprises an impeller on said rotor which imparts radial and rotational components of flow to the fluid.

15. The machine defined in claim 13 wherein said fluid impelling means comprises surfaces on said rotor at the interpolar spaces and of sufficient area for fluid drag thereon to induce vortical fluid flow in the interpolar spaces.

16. The machine defined in claim 13 wherein said interpolar spaces have vortex inducing curvatures of which the centers of curvature lie on radially directed axes.

17. The machine defined in claim 16 wherein said curvatures have surfaces which are irregular.

18. The machine defined in claim 16 wherein each interpolar space contains an elongated core member disposed radially in the middle of the vortex.

19. The machine defined in claim 12 wherein said means for inducing vortical fluid flow in an interpolar space comprises means for directing at least one stream of said fluid tangentially into the interpolar space.

20. The machine defined in claim 16 wherein said means for inducing vortical fluid flow in an interpolar space includes means for directing at least one stream of said fluid tangentially into the interpolar space.

21. The machine defined in claim 16 wherein said curvatures are semi-circular.

22. The machine defined in claim 16 wherein said curvatures are semi-elliptical.

* * * * *